Takewo Chiku and
Isemi Igarashi
Inventors

By Wenderoth, Lind & Ponack,
Attorneys

Sept. 24, 1968 TAKEWO CHIKU ET AL 3,402,609

SEMICONDUCTOR MECHANICAL-TO-ELECTRICAL TRANSDUCER

Filed Sept. 16, 1965 3 Sheets-Sheet 2

Takewo Chiku and
Isemi Igarashi
Inventors

By Wenderoth, Lind and Ponack
Attorneys

Takewo Chiku and
Isemi Igarashi,
Inventors
By Wenderoth, Lind and Ponack,
Attorneys United States Patent Office 3,402,609
Patented Sept. 24, 1968

3,402,609
SEMICONDUCTOR MECHANICAL-TO-ELECTRICAL TRANSDUCER

Takewo Chiku, Nishikamo-gun, and Isemi Igarashi, Nagoya, Japan, assignors to Kabushiki Kaisha Tokota Chuo Kenkyusho, Aichi Prefecture, Japan
Filed Sept. 16, 1965, Ser. No. 487,693
Claims priority, application Japan, Sept. 29, 1964, 39/55,526; Oct. 29, 1964, 39/61,411
10 Claims. (Cl. 73—398)

ABSTRACT OF THE DISCLOSURE

A mechanical to electric transducer comprising a pair of resilient diaphragms having different thickness and in opposed, closely spaced relationship, and at least one strain sensing element of semiconductive material attached on the inner surface of each diaphragm. The strain sensing elements are equal in properties to each other and electrically connected to provide a difference between outputs from the elements on the two diaphragms due to surface strains in the diaphragms caused by a pressure to be measured. The diaphragms have nearly free-edge mounting characteristics so that the conversion sensitivity is increased.

This invention relates in general to a mechanical-to-electrical transducer device and more particularly to such a transducer device utilizing a semiconductive material.

It is a frequent practice to apply a pressure to be measured to a diaphragm to cause a surface strain thereon which, in turn, is converted into an electrical signal by a strain gauge of the electric resistance wire or foil-gauge or semiconductor type.

A general object of the invention is to provide a new and improved mechanical-to-electrical transducer device of the type utilizing the abovementioned surface strain in which a semiconductive material is used to convert a pressure into an electrical signal.

An object of the invention is to provide an improved mechanical-to-electrical transducer device of the type above described and having satisfactory temperature compensation characteristics by which the temperature of a pressurized medium whose pressure is to be measured does not substantially affect the output from the transducer device.

Another object of the invention is to provide an improved mechanical-to-electrical transducer device of the type above described and capable of being affected by an applied acceleration only to an extent tolerable for practical purposes.

A further object of the invention is to provide an improved mechanical-to-electrical transducer device of the type above described wherein any vibration and/or any shock that might be applied to a casing therefor is prevented from being transmitted to a transducer element in the casing while the latter element is responsive only to a pressure in a pressurized medium.

A still further object of the invention is to provide an improved mechanical-to-electrical transducer device capable of producing an output higher than that previously attainable, with a high accuracy of measurement.

With the aforesaid objects in view, the invention resides in a semiconductor mechanical-to-electrical transducer device characterized by a pair of diaphragms made of the same resilient material in different thicknesses and disposed in opposed and closely spaced relationship to form a closed space, said pair of diaphragms being capable of being subjected to a common pressure to be measured in a pressurized medium to produce surface strains. At least one semiconductor strain sensing element is attached to the surface of each diaphragm the electric resistance of which changes in accordance with said surface strain on the associated diaphragm. The semiconductor elements on both diaphragms are substantially equal in properties to each other, and arranged to provide a difference between electric outputs due to the surface strains.

In one preferred embodiment of the invention the pair of diaphragms may be rigidly secured at the peripheral edges to a short shell forming a side wall of a closed space. In order to increase the output from the device, each of the diaphragms may be secured to the shell of the closed space through a relatively thin circumferential rim extending a short distance from the peripheral edge and inclined inwardly.

Conveniently, the diaphragm may be made of any suitable resilient metallic material and the semiconductor strain-sensing element or elements may be electrically insulated from the associated diaphrgam.

Alternatively the diaphragm may be composed of a semiconductive material and the strain-sensing elements may be formed thereon by the epitaxial growth or diffusion method.

The invention as to its organization and its mode of operation as well as other objects and advantages thereof will become more readily apparent from the following detailed description taken in conjunction with the accompanying drawings in which.

Figure 1:
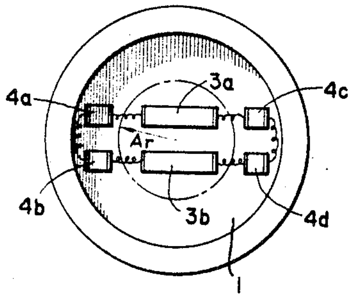
FIG. 1 is a plan view of a device constructed in accordance with the teachings of the prior art.
Figure 2:
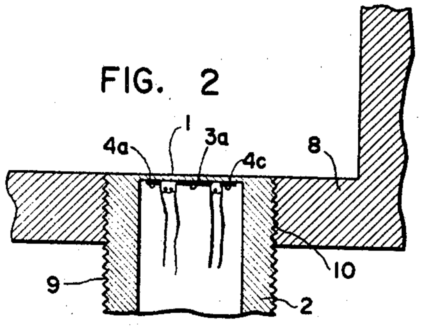
FIG. 2 is a fragmental longitudinal sectional view of the device illustrated in FIG. 1 and a mounting therefor.
Figure 3:
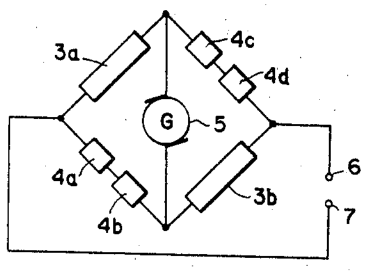
FIG. 3 is a schematic diagram of an electric circuit which may be used with the device illustrated in FIGS. 1 and 2.

Referring now to FIGS. 1 and 2, there is illustrated a semiconductor mechanical-to-electrical transducer device for converting a pressure into an electrical signal in accordance with the prior art practice. An arrangement illustrated comprises a disk-like diaphragm 1 of any suitable resilient material rigidly secured to a hollow shell member 2 of circular cross section and a plurality of strain-sensing elements 3a and b and 4a through d attached to the internal surface of the diaphragm 1. These elements may be made of any suitable semiconductive material such as germanium or silicon. As best shown in FIG. 1 a plurality of larger elements, in this case two larger elements 3a and b, are disposed substantially on the central portion while the four smaller elements 4a through d are disposed on the peripheral portion of the diaphragm 1 in alignment with each larger element. As shown in FIG. 3, all the strain-sensing elements are electrically connected into a bridge circuit including a pair of opposed arms composed of the two larger elements 3a and b respectively and another pair of opposed arms each composed of two smaller elements 4a and b or 4c and d which are disposed on the same side of the larger elements and serially connected. One diagonal of the bridge circuit has a source of electric power 5 disposed thereon and the other diagonal includes a pair of terminals 6 and 7 adapted to be connected to an electrical measuring instrument (not shown).

In order to operatively couple the device above described to a pressurized container having a side wall 8 (see FIG. 2), the cylindrical shell member 2 may be provided on the outer periphery with a screw-threaded portion 9. Then the shell member 2 is screwed into a screw-threaded bore 10 formed in the side wall 8, until the external surface of the diaphragm is substantially flush with the internal wall surface of the side wall 8. Thus the surface of the diaphragm 1 exposed to the interior of the pressurized container will be subjected to a pressure dominant in the interior of the container. On the other hand, the opposite surface of the diaphragm can communicate with the ambient atmosphere through the internal hollow space of the shell member 2. This results in pressure being uniformly applied on the entire surface of the diaphragm 1 to cause a stress on the latter. It will be appreciated that the diaphragm may be secured directly in the bore to form a part of the side wall with a satisfactory result.

Figures 4A, 4B:
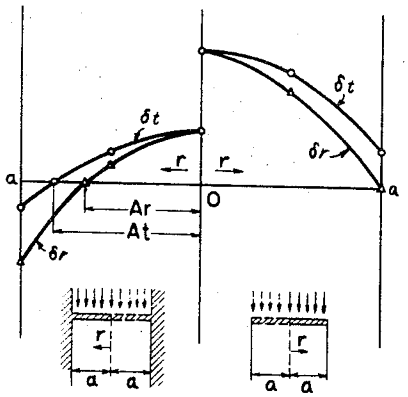
FIG. 4A is a graph illustrating the distribution of stress on a circular diaphragm caused by a uniformly distributed pressure applied thereto with the peripheral edge rigidly clamped.
FIG. 4B is a graph similar to that illustrated in FIG. 4A but illustrating the case when the diaphragm has a free peripheral edge.

Under these circumstances, as the circular diaphragm 1 is fixedly clamped at the peripheral edge, the stress produced on the diaphragm is distributed in the manner as shown in FIG. 4A wherein the ordinates represent stress and the abscissa represents the radial distance from the center of a circular diaphragm whose radius is a and has the peripheral edge fixedly clamped. As shown in FIG. 4A, the stress thus produced has a radial component $\delta_r$ having a null magnitude at a radial distance $A_r$ from the center of the diaphragm and a circumferential component $\delta_t$ having a null magnitude at a radial distance $A_t$ from the center. Both components of the stress are reversed in polarity at those respective points. In other words, each component of the stress in the inside domain with respect to a circle having the radius of $A_r$ or $A_t$ is different in polarity from that in the outside domain.

The conventional type of mechanical-to-electrical transducer devices for converting a pressure into an electrical signal all have utilized this reversal of the polarity of stress just described. More specifically, the diaphragm involved is divided into an outside and an inside portion by the abovementioned circle having a radius of $A_r$ or $A_t$. The larger strain-sensing elements such as the elements 3a and b serve to sense the stress on the inner portion while the smaller strain-sensing elements such as the elements 4a through d serve to sense the stress on the outer portion of the diaphragm. Those elements are electrically connected into a bridge circuit thereby to compensate for any change in temperature. However, in order to satisfactorily compensate for a change in temperature in this manner one set of the larger transducer elements is required to have the change-in-resistance characteristics due to a change in temperature, substantially equal to those of the other set of smaller elements. This has made it difficult to select the individual elements as to their properties, dimensions and combinations. In addition, the conventional transducers are disadvantageous in that pressures rapidly varying and/or very low in magnitude are difficult to measure. This is because the shell member 2 is fixedly secured to the side wall 8 of the pressurized container. Alternatively the diaphragm 1 forms directly a part of the wall of the transducer thereby to permit any external mechanical vibration to be transferred directly to the transducer.

The invention contemplates elimination of the abovementioned disadvantages of the conventional transducers by the provision of a new and improved mechanical-to-electrical transducer device adapted to be effectively disposed in a pressurized medium in a pressurized container whose pressure is to be measured whereby the same is allowed to satisfactorily follow any pressure varying rapidly in magnitude and has a sensitivity sufficient to measure any very low pressure.

According to one aspect of the invention, a pair of diaphragms composed of resilient material identical in properties to each other respectively but different in thickness are disposed in opposed and closely spaced relationship to form a transducer wherein both diaphragms are subject to a common pressure to be measured to produce surface strains thereon and have semiconductor strain-sensing elements attached to the opposed surfaces of both diaphragms, at least one for each diaphragm. Then the strain-sensing element or elements will produce an electric output dependent upon the pressure applied to the associated diaphragm and the difference between the outputs resulting from both diaphragms provides an output from the device. The utilization of the output differential leads to the complete temperature compensation characteristics and to the minimization of noise due to any acceleration applied to the transducer.

According to another aspect to the invention, each of the diaphragms is secured at the peripheral edge to a bevelled thin portion of a closed wall whereby a pressure applied to the diaphragm produces a surface strain thereon under the conditions approximating those for freely supporting the peripheral edge of the diaphragm. This measure causes an increase in output from the diaphragm while providing a sensitive mechanical-to-electrical transducer by having a relatively large area of the diaphragm over which transducer elements are attached to the diaphragm as will be apparent hereinafter.

In a preferred embodiment of the invention the diaphragm may be of any suitable monocrystalline semiconductor, and includes at least a strain-sensing element of a similar or dissimilar semiconductive material formed integrally on the diaphragm as by the epitaxial growth or diffusion method or the like. Thus, for a given pressure a stress applied to the strain-sensing element will be equal to that applied to the diaphragm resulting in an increase in both output and the sensitivity of the device.

Figure 5:
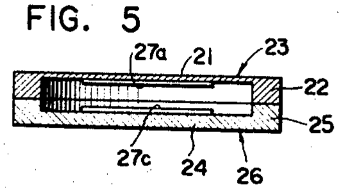
FIG. 5 is a longitudinal sectional view of a device constructed in accordance with the teachings of the invention.
Figure 6:
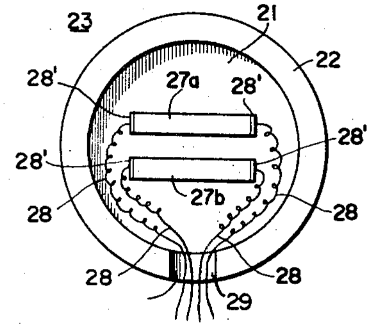
FIG. 6 is a schematic view illustrating the internal construction of the device shown in FIG. 5.
Figure 7:
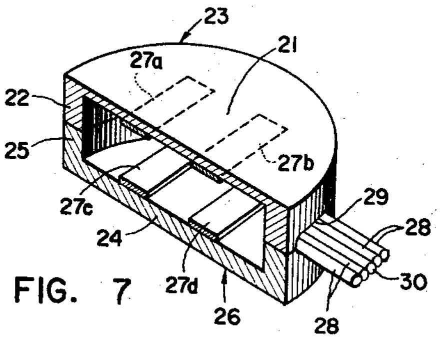
FIG. 7 is a fragmental perspective view of the device illustrated in FIGS. 5 and 6.

Referring now to FIGS. 5 through 7, there is illustrated a semiconductor mechanical-to-electrical transducer device constructed in accordance with the teachings of the invention. The arrangement illustrated comprises a disk-like diaphragm 21 of any suitable resilient material such as a carbon steel and a hollow cylindrical projection or axial rim 22 extending a short distance from the circumferential edge of the diaphragm to form one tray generally designated by the reference numeral 23. Another disk-like diaphragm 24 composed of any suitable resilient material identical in properties to the material for the diaphragm 21 but thicker than the latter has a hollow cylindrical projection or axial rim 25 similarly extending integrally from the circumferential edge of the same to form other tray generally designated by the reference numeral 26. Rigidly attached on the internal surface of each diaphragm 21 and 24 are a plurality of strain-to-electrical energy converting elements 27a and b or 27c and d comprised of any suitable semiconductive materials similar in properties. The both trays are attached to each other with the free end of the rim 22 engaged with the free end of the other rim 25 to form a closed space. As shown in FIG. 6, a pair of electrical leads 28 are electrically connected to the both end faces of each sensing element 27*a*, *b*, *c*, *d* and sealed in a common opening 29 formed in the rims for connection to sensing means as will be described hereinafter.

As an example, the diaphragms 21 and 24 were made of a carbon steel, and the diaphragm 24 had a thickness equal to three times that of the diaphragm 21. A single monocrystalline semiconductive material such as germanium was cut into wafers having the same properties to provide the strain-sensing elements 27*a* through *d*. Then a pair of wafers thus produced were bonded to the internal surface of each diaphragm by any suitable electrically insulating adhesives.

As previously explained, each diaphragm may be preferably made of a monocrystalline semiconductor and have at least one strain-sensing element of a monocrystalline semiconductive material formed integrally thereon in any desired shape as by the epitaxial growth or diffusion method or the like. For exmaple, the diaphragms 21 and 24 in another embodiment each were composed of p type silicon having a [111] crystallographic orientation along one diameter thereof. In this case, the thicker diaphragm had a thickness equal to three times that of the thinner one. A pair of sensing-elements 27*a* and *b* or 27*c* and *d* were produced on the internal surface of the diaphragm in the [111] crystallographic direction of the latter by the epitaxial growth or diffusion process. Then attached to both ends of each strain-sensing element were a pair of terminals 28' of any suitable electrically conductive material such as gold in nonrectifying contact therewith by any suitable known process with the length substantially equal to the width of the element. Each of the terminals 28' had attached thereto a lead 28.

Both trays 23 and 26 including respectively the circumferential rims 22 and 25, the diaphragms 21 and 24 and a plurality of transducer elements 27*a*, *b* and 27*c*, *d* formed in either of the manners as above described can now be connected and hermetically sealed to each other such that the rims 22 and 25 contact each other. The leads 28 extend through the opening 29 in the rims and then the opening is closed with any suitable filled material such as an extoxyline resin marketed as Araldite (Trade Mark) to form an enclosed device. It desired, a hollow pipe 30 may be sealed in the opening 29 for a purpose as will be apparent hereinafter.

Figure 8:
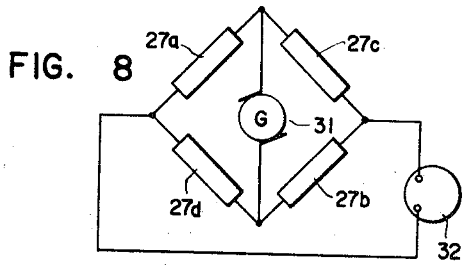
FIG. 8 is a schematic diagram of an electric circuit which may be used with the invention.

The leads 28 can be utilized to connect the strain-sensing elements 27*a* through *d* in a bridge type electrical circuit as shown in FIG. 8. In FIG. 8 the bridge circuit has four arms including the strain-sensing elements, one for each arm, with one pair of terminals on one diagonal connected to a source of electrical power 31 and the other pair of terminals on the other diagonal connected to a pair of input terminals 32 to an indicating device (not shown).

Figure 10:
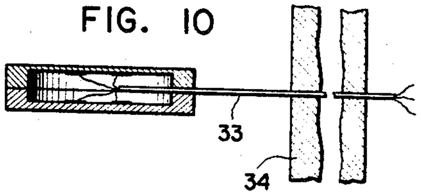
FIG. 10 is a schematic sectional view of the device illustrated in FIGS. 5 through 7, in its operating position.

The semiconductor mechanical-to-electrical transducer device thus far described is operated as follows: When the device is disposed within a pressurized container the pressure in which is to be measured, the diaphragms 21 and 24 are subject to the pressure dominant in the container to cause surface strains thereon. It is to be understood that one of the diaphragms has applied thereto a pressure equal in magnitude to that applied to the other diaphragm. The interior of the container may preferably communicate with the ambient atmosphere or an atmosphere having a reference pressure by any suitable means such as a communicating tube 33 hermetically connected to the pipe 30 on the device and extending through one wall 34 of container as shown in FIG. 10. This prevents pressure in the device from affecting both diaphragms. The communicating tube 33 serves also to support the device on the wall 34 of the container while preventing any vibration and/or shock applied to the container from being transmitted to the device. This ensures that the device responds only to a pressure in the container.

A surface strain on the diaphragm caused by a pressure applied thereto is inversely proportional to the square of the thickness of the diaphragm. Therefore the strain-sensing element attached to or formed integrally with the diaphragm will provide an electric output inversely proportional to the square of the thickness of the associated diaphragm so long as the same is supplied with a voltage.

With four strain-sensing elements 27*a* through *d* connected in the bridge circuit as shown in FIG. 8, a difference between the sum of the outputs from one pair of transducer elements 27*a* and *b* operatively coupled to the diaphragm 21 and the sum of the outputs from the other pair of transducers 27*c* and *d* is sensed providing an electric output proportional to the pressure in the container. It is to be noted that since the strain-sensing elements 27*a* through *d* have the same properties and more particularly the same temperature dependent conversion characteristics, any change in temperature in the pressurized container does not affect the output from the device. In other words, the present device has perfect temperature compensation characteristics.

During measurement of the pressure, the container may be subjected to a vibration and/or shock and be given a corresponding acceleration, which, in turn, affects the output from the device. Such acceleration generally has a magnitude linearly proportional to the amplitude of the vibration or shock. If both diaphragms have the same thickness, the effect of acceleration is fully compensated for. However, it has been found that, even with the diaphragms different in thickness, as previously described, the effect of such acceleration on the output of the device is relatively small as compared with the surface strain of the diaphragm caused by the pressure applied thereto and is reduced sufficiently so that it is tolerable for practical purposes.

Figure 9:
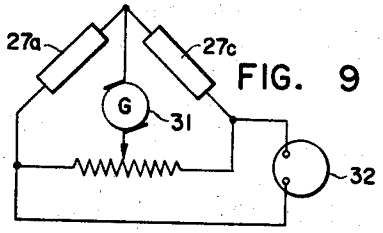
FIG. 9 is a schematic diagram of another electric circuit which may be used with the invention.

While the invention has been described including a pair of transducer elements on each of the diaphragms it is to be understood that a single transducer element such as 27*a* or 27*c* may be operatively associated with each diaphragm with both elements electrically connected into a bridge type circuit as shown in FIG. 9.

Figure 11:
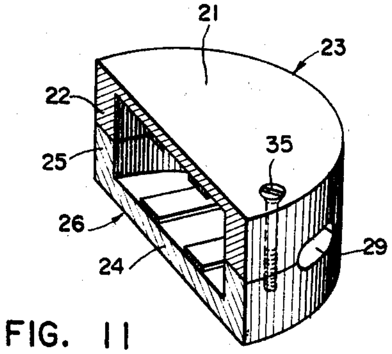

In order to maintain both trays 23 and 26 in a unitary structure, the arrangement shown in FIG. 11 may be used wherein one of the trays for example the upper one 23, has a hole through the rim and the lower tray 26 has a corresponding threaded hole in the rim. A fastening screw 35 is threaded through the hole and screwed into the threaded hole on the lower tray 26.

Figure 12:
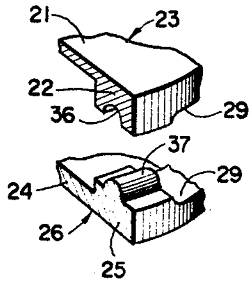
FIGS. 11, 12 and 14 are fragmental perspective views illustrating the manner in which a diaphragm is rigidly secured to the associated casing.

In FIG. 12, the circumferential rim of one of the trays, for example the rim 22, has provided on the free end face a circumferential groove 36 while the lower rim 25 has provided on the free end face a circumferential ridge 37 complemental in configuration to the groove 36. When both trays are assembled, the ridge 37 is snugly fitted into the groove 36 whereby the contact area between both rims 22 and 25 increases ensuring that a fluid in a pressurized atmosphere is prevented from entering the interior of the device along the engaging end surfaces of the rims.

Figure 13:
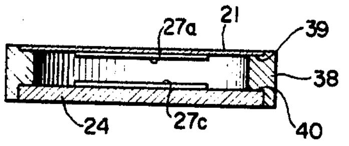
FIG. 13 is a longitudinal sectional view of one embodiment of the invention.
Figure 15:
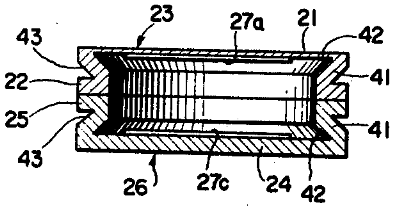
FIG. 15 is a longitudinal sectional view of another device constructed in accordance with the teachings of the invention.
Figure 14:
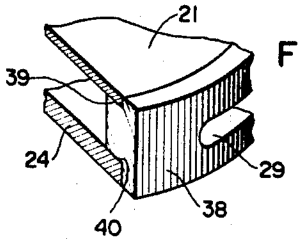
Figure 18:
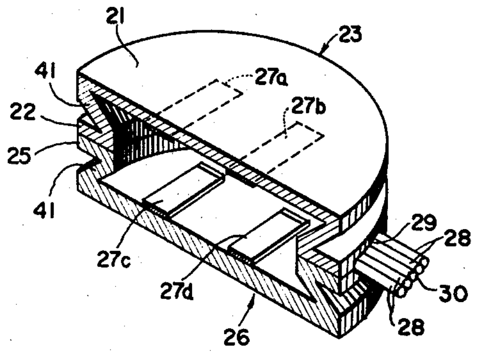
FIG. 18 is a fragmental perspective view of the device illustrated in FIGS. 15 through 17.
Figure 16:
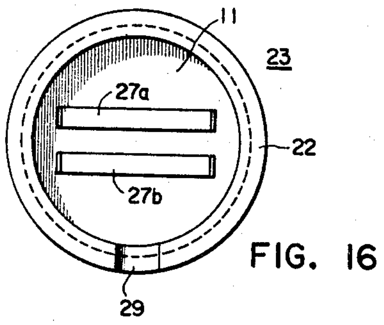
FIG. 16 is a bottom view of the device illustrated in FIG. 15.
Figure 17:
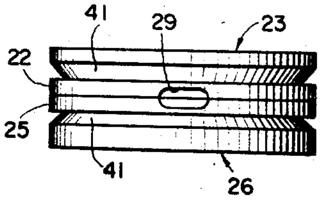
FIG. 17 is a side elevational view of the device illustrated in FIGS. 15 and 16.

In the arrangement shown in FIGS. 13 and 14, a peripheral wall member 38 in the form of a hollow cylinder is used in place of two rims 22 and 25. As in the case of the rims the peripheral wall member 38 includes a circumferentially elongated slot 29. A pair of circular diaphragms 21 and 24 similar to the diaphragms as previously described in conjunction with FIGS. 5 through 7 are rigidly secured to stepped portions 39 and 40 formed on both ends of the wall member respectively. Further each of the diaphragms has at least one strain-sensing element, as previously described, attached to or formed integrally with the same.

The embodiments of the invention above described each include a pair of diaphragms 21 and 24 clamped at their peripheral edges. Under these circumstances, the diaphragm having applied thereto a pressure has radii of $A_r$ and $A_t$ such that the radial and circumferential components $\delta_r$ and $\delta_t$ of the stress produced therein on each of circles having the radii $A_r$ and $A_t$ become null respectively as previously described in conjunction with FIG. 4A. Also these components of the stress will be reversed in polarity on those circles. Therefore if the strain-sensing elements on the diaphragm exceed either of those circles, their conversion performance will be reduced. For this reason, the use of long transducer elements does not always lead to a high sensitivity.

On the contrary, if a diaphragm which is free at its peripheral edge has a pressure uniformly distributed thereon, it has no radius at the end of which the radial or circumferential component of the stress produced thereby reverses in polarity as shown in FIG. 4B. This results in an increase in available stress. It is therefore desirable to use a diaphragm which is free at its peripheral edge thereby to increase that area thereof on which a strain-sensing element or elements is or are attached to the diaphragm and hence the output from the device. This is particularly advantageous in the case of small-size transducer devices.

Referring now to FIGS. 15 through 18 there is illustrated a modification of the invention wherein a pair of diaphragms are supported at the peripheral edges under the conditions approximating those of a free perimeter. The arrangement illustrated in FIGS. 15 through 18 is similar to that shown in FIGS. 5 through 7 except for an inwardly inclined wall portion 41 in the form of a truncated cone connecting the associated diaphragm 21 or 24 to a shell or rim 22 or 25. To this end, the cylindrical rim 22 or 25 is provided on that portion of the inner wall adjacent to the associated diphragm and on the intermediate portion of the outer wall with a pair of wedge-shaped circumferential grooves 42 and 43 to form the inclined wall portion 41 of relatively small thickness.

With the arrangement illustrated, the diaphragm 21 or 24 is connected at an acute angle to the inclined thin wall portion 41 and hence it is considered and has been proved that upon applying a uniform pressure over the entire surface of the diaphragm, the stress produced thereby approximates the stress illustrated in FIG. 4B. In other words, the diaphragms shown in FIGS. 15 through 18 meet approximately the conditions for freely supporting the edge of the diaphragm. Therefore the strain-sensing element or elements can be disposed over a large area of the internal surface of the diaphragm leading to an increase in sensitivity.

It is to be understood that only a single wedge-shaped groove 42 may be satisfactorily used.

As an example, a mechanical-to-electrical transducer device such as shown in FIGS. 5 through 7 comprised a thinner diaphragm 21 having a thickness of 0.2 mm. and a thicker diaphragm 24 having a thickness of 0.5 mm. Both diaphragms were made of JIS (Japanese Industrial Standard) types S55C carbon steel including 0.50–0.60% C, 0.15–0.40% Si, 0.40–0.85% Mn, $<0.035\%$ P, $<0.40\%$ S and the balance iron, which was formed into trays 23 and 26 having an outer diameter of 5 mm., an inner diameter of 4 mm., and a height of 1.5 mm. An N conductivity monocrystalline germanium having a [111] crystallographic orientation was cut into wafers having a dimension of 2.5 mm. by 0.3 mm. and 0.03 mm. thick by a diamond saw. Four wafers **27*a* through *d* chosen so as to have substantially equal properties were bonded to the internal surfaces of the diaphragms, two for each surface, by Araldite (trademark) resin. Then both trays 23 and 26 were united together by the same resin to a thickness of 1.5 mm. The device was completed by attaching the leads 28 to the wafers 27*a* through *d* and then extending the leads and a pipe 30 through the elongated opening 29** in the side wall followed by hermetically sealing the opening.

The resulting device was tested and had an output reduced by approximately 15% as compared with the sum of the outputs due to the surface strains on both diaphragms with a ratio between both outputs being approximately 6:1. This is because the output from the device is the difference between the outputs caused by the distorted diaphragms. A noise level resulting from an acceleration applied to the device due to a mechanical vibration was less than one hundredth of the level of the total signal output and has been found to be satisfactory for all practical purposes. Also it has been found that the device was fully compensated for any change in temperature in a pressurized atmosphere to be measured.

Since the present device can be made small as above described and also as light as 0.3 gram, the same can be inserted into a pressurized medium through a small port and fixed in the medium by having the connecting tube 33 connecting the device to the wall 34. Therefore the connecting tube 33 and/or the leads 28 play or plays a role of a buffer for transmission of vibration. Therefore the invention has an advantage in that it reduces transmission of mechanical vibrations from a mounting such as the wall 34 to the device.

Another device was made by repeating the procedure just described excepting that a p type monocrystalline silicon was used to produce a pair of diaphragms 21 and 24 having the respective rims 22 and 25, each having a [111] crystallographic direction along the diameter and the strain-sensing elements were produced on the internal surface of each diaphragm in the [111] crystallographic direction by the epitaxial growth technique with terminals plated on both ends of each element. The resulting device gave substantially the same results as the above described device.

The invention has been illustrated and described with reference to certain preferred embodiments thereof, but it is to be understood that various changes and modifications may be resorted to without departing from the spirit and scope of the invention. For example, the diaphragm may have any desired shape other than a circular shape and have any desired curved surface such as a spherical surface. Instead of means for communicating the interior of the device with the ambient atmosphere or a reference pressure, spring means may be disposed in the interior of the device tending to separate one diaphragm from the other diaphragm, the strength of the spring means being preliminarily adjusted in accordance with the range of pressure to be measured.

What we claim is:

1. A semiconductor mechanical-to-electrical transducer device comprising a pair of diaphragms of resilient material, one diaphragm having a different thickness from the other, said diaphragm being disposed in opposed, closely spaced relationship and defining an enclosed space therebetween, said diaphragms being capable of being subject to a common pressure to be measured in a pressurized medium to produce surface strains therein, at least one strain sensing element of semiconductive material disposed on only the internal surface of each of said diaphragms and exposed to said enclosed space, said strain sensing elements being equal in properties to each other and responsive to the surface strain in the associated diaphragm with a change in the internal electric resistance thereof, and a source of electric energy, said source and said strain sensing elements being coupled to produce outputs of said strain sensing elements and to provide a combined electric output corresponding to a difference between the electric output from said at least one strain sensing element on one of said diaphragms and the electric output from said at least one strain sensing element on the other diaphragms, electric output from said strain sensing elements depending on the internal resistance thereof, said combined electric output providing a measure of the pressure exerted on said device.

2. A semiconductor mechanical-to-electrical transducer device comprising a pair of diaphragms of a resilient material with one diaphragm having a different thickness than the other, a short shell member, the peripheral edges of said diaphragms being secured to the opposite ends of the short shell member to form a closed space, said diaphragms being capable of being subjected to a common pressure to be measured in a pressurized medium to produce surfaces strains thereon, at least one strain-sensing element of semiconductive material attached to only that surface of each of said diaphragms exposed to the interior of said closed space, a change in the surface strain on the associated diaphragm causing a change in the internal resistance of said strain-sensing elements, said strain-sensing elements on both diaphragms being identical in properties to each other, a source of electric energy, said source and said strain-sensing elements being coupled to produce outputs of said strain-sensing elements and to provide a combined electric output corresponding to the difference between the electric output from said at least one strain-sensing element on one of said diaphragms and the electric output from said at least one strain-sensing element on the other diaphragm, outputs from said strain-sensing elements depending on the internal resistance thereof.

3. A semiconductor mechanical-to-electrical transducer device as claimed in claim 2, wherein said diaphragms are each circular and said short shell member being axial rims extending a short distance from the peripheral edges of said diaphragms, said axial rims being joined together to form said closed space.

4. A semiconductor mechanical-to-electrical transducer device as claimed in claim 2, wherein said pair of diaphragms are composed of a resilient metallic material and said at least one strain-sensing element is attached on the internal surface of the associated diaphragm by an electrically insulating resin.

5. A semiconductor mechanical-to-electrical transducer device as claimed in claim 2, wherein said pair of diaphragms are composed of a monocrystalline semiconductive material and said at least one strain-sensing element is an epitaxial layer disposed on the associated diaphragm.

6. A semiconductor mechanical-to-electrical transducer device as claimed in claim 2, wherein said pair of diaphragms are composed of monocrystalline semiconductive material and said atleast one strain-sensing element is a diffused layer of semiconductive material on the associated diaphragm.

7. A semiconductor mechanical-to-electrical transducer device as claimed in claim 1, wherein said shell member is constituted by two side walls, each of said side walls being a relatively thin wall angled inwardly from the peripheral edge of the diaphragm whereby said diaphragms are supported in substantially free edge conditions.

8. A semiconductor mechanical-to-electrical transducer device as claimed in claim 7, wherein said pair of diaphragms are resilient metallic material and said at least one strain-sensing element is attached to the internal surface of the associated diaphragm by an electrically insulating resin.

9. A semiconductor mechanical-to-electrical transducer device as claimed in claim 7, wherein said pair of diaphragms are a monocrystalline semiconductive material and said at least one strain-sensing element is an epitaxial layer disposed on the associated diaphragm.

10. A semiconductor mechanical-to-electrical transducer device as claimed in claim 7, wherein said pair of diaphragms are monocrystalline semiconductive material and said at least one strain-sensing element is a diffused layer of a semiconductive material on the associated diaphragm.

References Cited

UNITED STATES PATENTS

| | | | |
|---|---|---|---|
| 2,643,869 | 6/1953 | Clark | 73—497 |
| 2,882,731 | 4/1959 | Peucker | 73—398 |
| 3,230,763 | 1/1966 | Frantzis | 73—141 |
| 3,292,128 | 12/1966 | Hall | 338—2 |
| 3,315,301 | 4/1967 | Werme | 338—2 |
| 3,323,358 | 6/1967 | Fraioli | 73—141 |

MILTON O. HIRSHFIELD, *Primary Examiner.*

W. E. RAY, *Assistant Examiner.*